Sept. 18, 1951     A. C. RUGE     2,568,596
SPRING TESTER

Filed Dec. 14, 1944     3 Sheets-Sheet 1

INVENTOR
Arthur C. Ruge
BY
ATTORNEY

Sept. 18, 1951     A. C. RUGE     2,568,596
SPRING TESTER
Filed Dec. 14, 1944     3 Sheets-Sheet 2
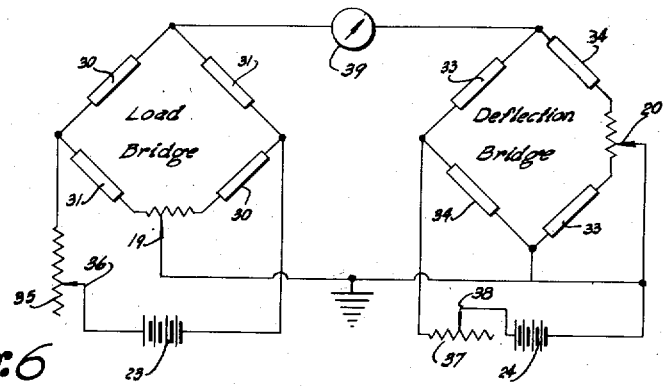
Fig. 6
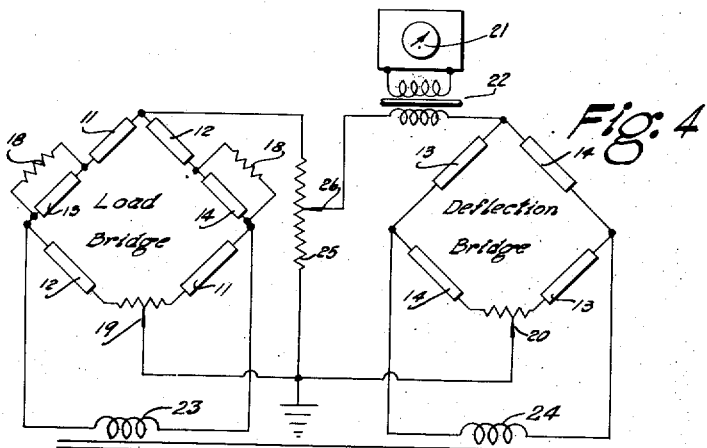
Fig. 4
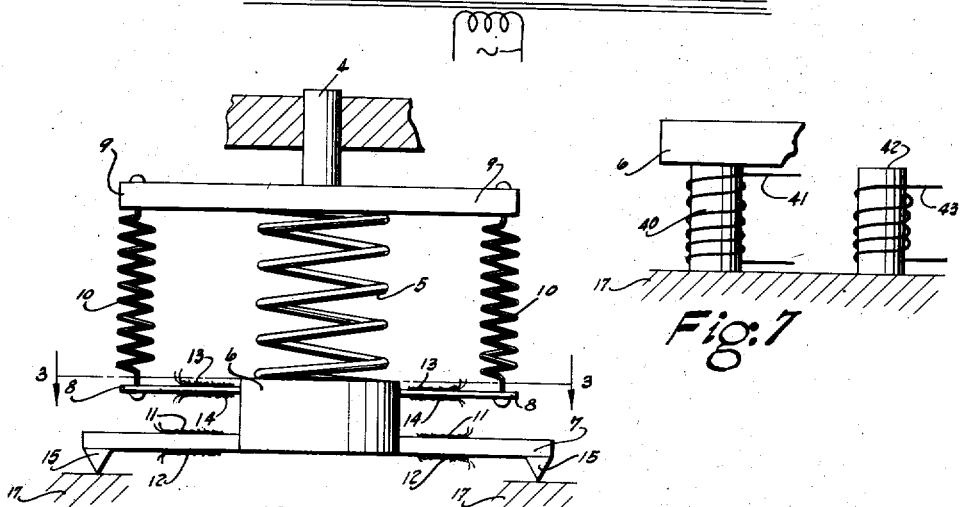
Fig. 7
Fig. 2
INVENTOR
Arthur C. Ruge
BY
ATTORNEY Sept. 18, 1951  A. C. RUGE  2,568,596
SPRING TESTER
Filed Dec. 14, 1944  3 Sheets-Sheet 3

INVENTOR
Arthur C. Ruge
BY
ATTORNEY

Patented Sept. 18, 1951

2,568,596

UNITED STATES PATENT OFFICE 2,568,596

SPRING TESTER

Arthur C. Ruge, Cambridge, Mass., assignor to Baldwin-Lima-Hamilton Corporation, a corporation of Pennsylvania Application December 14, 1944, Serial No. 568,080

8 Claims. (Cl. 73—161)

My invention relates generally to an apparatus and a method for testing springs as to their stiffness and it is an object of my invention to provide an improved apparatus and method that are particularly suited for production testing where it is desired to determine quickly and accurately whether or not a given spring is within specific tolerance.

In present-day practice it is common to specify that, between 1/Mth of capacity and full capacity load P, the spring shall at every point come within $\pm p\%$ of the specified load-deflection characteristic of K pounds per inch of deflection. For example, if $M=4$ and $p=2$, then from $\frac{1}{4}$ to full capacity the spring must come within $\pm 2\%$ of the specified stiffness at every point.

The present customary way of verifying the tolerance is to observe or record separately the load applied and the resulting deflection, or to construct a plot of the load-deflection curve, from which the deviation from the specified characteristic can be calculated. This is a slow process and requires extremely accurate measurements if selection is to be held within close limits. Supposing for instance that the accuracy of the individual measurements involved is $\pm\frac{1}{3}\%$, which is very good for commercial devices, then the error of observation at a given point can be as large as $\frac{2}{3}\%$. The spring manufacturer is then forced to discard many springs which are in reality within tolerance, or he is liable to find that his customer rejects many springs which he believed to be satisfactory.

A further object of my invention is to provide an improved apparatus controlled by a plurality of conditions but adapted to be responsive only to deviations from a predetermined characteristic.

In my improved device and method for testing springs, the load and deflection are impressed upon respective electrical impedance-sensitive elements which are opposed electrically in such a manner that only the deviations from a predetermined characteristic are indicated or recorded. To do this, I preferably employ bonded wire strain gages which I have demonstrated to be exceedingly precise and linear in their response to strain when properly constructed. I can also use many other impedance-responsive electrical devices, such as variable capacity gages, carbon strip gages, carbon pile gages, electromagnetic gages, etc., all of well-known types and characteristics which can be readily found in the literature on gaging methods and devices. I can also employ such elementary impedance-sensitive elements as slidewire rheostats or potentiometers, as will be seen from my disclosure.

Other objects and advantages will be more apparent to those skilled in the art from the following description of the accompanying drawings in which:

Fig. 2 is a schematic outline of a testing machine embodying my invention;

Fig. 4 is a circuit diagram for obtaining cooperative action between the factors of load and deflection;

Fig. 6 is another circuit arrangement embodying my invention;

Fig. 7 is a modified load responsive means with temperature compensation;

Figure 1:
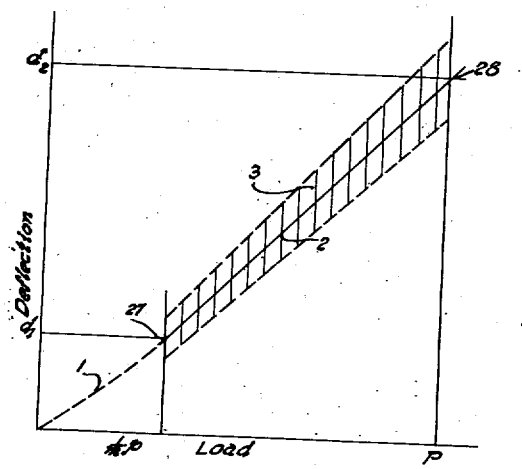
Fig. 1 is a spring tolerance diagram.

In order to explain the principle of my invention I have shown in Fig. 1 a typical spring tolerance diagram in which the important features mentioned above are indicated. The measurement generally begins at load $1/M \times P$, the corresponding deflection being $d_1$. The dashed section 1 of the curve is ordinarily not observed since it is affected by initial seating or straightening out of the spring. The straight line section 2 represents the specified K of the spring, K being defined as the ratio $$\frac{P - 1/M \times P}{d_2 - d_1}$$

The shaded area 3 represents the specified tolerance within which the actual load-deflection characteristic must lie if the spring is to be accepted. It is to be recognized that this diagram is only one example of a tolerance specification and is used for illustrative purposes only to make clear the functioning of my invention.

In Fig. 2 I show schematically one means with which I accomplish the desired result. While I have shown here a preferred embodiment utilizing resistance-sensitive strain gages in which the electrical resistance of a wire, bonded to a member subject to strain, varies with the strain, my invention is by no means restricted to their use, as will readily be seen by the disclosure herein of other types of gages. The spring loading apparatus comprises a suitably actuated and guided head 4 movable vertically to apply load to a spring 5 under test which rests on a supporting block 6. A plurality, preferably three, elastic flexing members or arms 7 project from block 6 to carry the resultant load to the bed 17 of the apparatus through load points 15. Other elastic flexing members 8 projecting from support 6 are connected to projections 9 extending from head 4 by elastic deflection springs 10.

Figure 3:
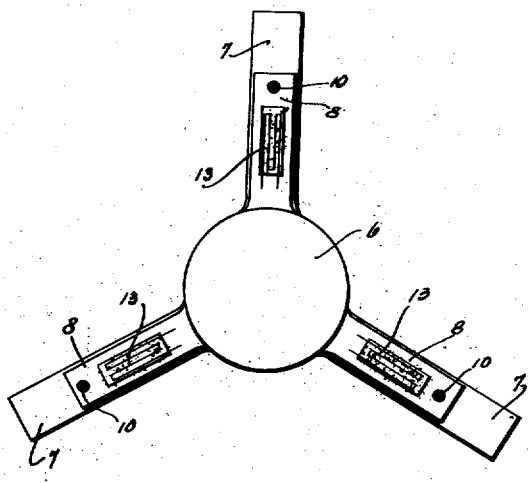
Fig. 3 is a sectional plan view taken substantially on line 3—3 of Fig. 2.

Preferably, but not necessarily, members 7 are stiff or rigid relative to springs 5 and 10, while springs 10 are soft or limber relative to both spring 5 and members 8 and 9. Members 7 while relatively rigid have some degree of flexibility. Each set of flexing members 7 and 8 are in multiple, there being preferably at least three sets so as to provide stability to the device as shown in Fig. 3. While I have shown flexing members 7 and 8 in the form of cantilevers, I may use any other form of elastic member or structure so long as the load carried thereby produces a strain or deflection suited to my purpose. In testing of heavy springs I may prefer for example to substitute members acting in direct tension or compression for flexing members 7 and 8. If the deflections are small I may substitute a link for spring 10.

Impedance-responsive electrical elements 11, 12, 13, 14 are shown here specifically as bonded wire strain gages for purposes of explanation. These elements are mounted in multiple so that they are of sufficient number and of such distribution as to satisfy my circuit and measuring requirements. I employ these elements to measure the loads or forces carried by members 7 and 8, which will be seen to be substantially proportional to the load on and the deflection of spring 5 respectively.

It will further be seen that, if members 7 are made sufficiently rigid so that their deflection under load is negligible relative to the deflection of spring 5, then I can, to advantage, support members 8 on the bed 17 of the device instead of on block 6. In this case it is clear that the output of gages 11 and 12 is proportional to the true load carried by spring 5, and the output of gages 13 and 14 is proportional to the deflection of spring 5 as transmitted to members 8 by deflection springs 10. In the circuit arrangement disclosed herein, I have shown how to treat the arrangement as illustrated in Fig. 2, which is more general, but it will be evident that many variations in arrangement of parts and circuits may be made without departing from the spirit of my invention.

Fig. 4 shows a circuit which is well suited to the purposes of my invention; and, while I claim this circuit specifically in combination, there are many other circuits which can be adapted to the same end but which need not be shown since they do not constitute inventions of mine but are merely incidental to it. At the left of Fig. 4, a "load bridge" comprised of responsive elements 11, 12, 13 and 14 is so connected as to make the unbalanced voltage of the bridge responsive only to the load on spring 5. Elements 11 and 12 are connected so as to have additive effect in producing unbalance with load. Elements 13 and 14 are shunted with suitable resistance 18 so that forces transmitted by springs 10 do not have any net unbalancing effect upon the load bridge. Resistances 18 are easily set to the correct value by moving head 4 up and down with spring 5 removed; under this condition (of zero load on spring 5) resistances 18 are adjusted once and for all so that the load bridge remains balanced regardless of the position of head 4. Any conventional balancing device such as 19 completes the bridge.

At the right of Fig. 4, a "deflection bridge" is comprised of responsive elements 13 and 14. It will be evident that, as a result of forces carried through springs 10, the unbalance of this bridge is proportional to the deflection of spring 5. A conventional balancing device 20 completes the bridge.

A voltage divider 25 across the output of the load bridge with a contactor 26 is used to obtain a selectable fraction of the unbalanced voltage of this bridge which is opposed to the unbalanced voltage of the deflection bridge. The net unbalance between the two bridges is carried to a suitable galvanometer, or amplifier and indicator or recorder 21, by coupling a transformer 22 or by direct coupling, as conditions dictate. The two bridges are powered with A. C. or D. C. voltages 23 and 24; a convenient arrangement is to let 23 and 24 be independent secondary windings on a transformer, the primary of which is fed by a suitable A. C. source of power. In explanation, indicator 21 responds to the sum of the voltage between ground and point 26 and the voltage between point 20 and the upper terminal of the deflection bridge. If these voltages are exactly equal and opposite then it is obvious that indicator 21 will show zero reading. If these two voltages are not equal and opposite indicator 21 will show a reading which results from what I call the "net unbalance between the bridges."

In the circuit shown, it is supposed that the output of the load bridge is greater than that of the deflection bridge. If the reverse is true, the voltage divider would merely be put across the deflection bridge and a selectable fraction of the voltage across it opposed to that of the load bridge. A more general arrangement would utilize voltage dividers across both bridges so that arbitrary ratios can be obtained, as will be easily seen.

*Operation.*—Assume that a spring is placed in the machine for test and that an initial load is applied bringing us to point 27 in the diagram of Fig. 1. The procedure would be as follows: Set contact 26 in Fig. 4 at a point on the calibrated voltage divider 25 corresponding to the specified stiffness K of the spring which is under test. Next, using either adjustment 19 or 20, or both if desired, adjust the circuit of Fig. 4 so that the resultant unbalance shown by indicator 21 is zero.

Now increase the load on the spring to point 28 in Fig. 1, all the while watching indicator 21 of Fig. 4, which indicator has been calibrated to read in terms of the deviation of the spring from the specified stiffness K. For convenience, the indicator might have a portion of its scale marked "good" and other portions marked "bad" so that an unskilled operator may properly select springs without any knowledge or understanding of the mode of operation of the device. Or the indicator may be made to light a lamp or to make an audible signal to characterize the acceptance or rejection of the spring.

The above description of the operation will serve to show how simply and conveniently I accomplish my purpose when I wish to establish the tolerance rating of a spring. It will be seen that I have so arranged the device that friction plays no part in the result. It will also be seen that both tension and compression springs are readily taken care of by simple modifications of the details of Fig. 2.

The testing of springs in torsion can be made by any simple torsion devices in place of 7 and 8, one possible form of torsional devices being shown in Simmons Patent No. 2,350,072 or in my copending application, Serial No. 430,921, now Patent No. 2,392,293.

Referring further to Fig. 4, it is to be noted that, whereas I have shown responsive elements in all arms of both bridges, it is obvious that some of these elements can be replaced with fixed or adjustable impedance elements not responsive to load or deflection of spring 5. Thus one element 11 and one element 13 would be sufficient in the load bridge and one element 13 would be sufficient in the deflection bridge. However, the arrangement I have shown is advantageous in that a higher sensitivity is obtained when more than one arm is operative and I also obtain temperature compensation by the balanced circuit arrangement shown.

Referring to Figs. 2 and 4, it may be observed that if members 8 are attached to the bed 17 of the device, so that none of their load is transmitted to members 7, then my circuit would be modified as follows in order to give perfect action: (a) The elements 13 would be omitted from the load bridge; and (b) one or more elements 11 or 12, or both, would be properly shunted and inserted in one or more arms of the deflection bridge. The result would be that the load bridge would be perfectly responsive to load on spring 5 without adjustment being required, and the deflection bridge would be so adjusted by shunting elements 11 and 12 that the deflection of members 7 is compensated for and its unbalanced voltage is responsive to the true deflection of spring 5.

I have pointed out that voltage divider 25 can be calibrated to read in terms of the spring stiffness K. This is because the condition of balance of meter 21 while changing the load by $P^1$ is that $C \times P^1 = d^1$ where C is a constant depending upon the position of contact 26 and $d^1$ is the deflection corresponding to load change $P^1$. Therefore $$\frac{P^1}{d^1} = K = \frac{1}{C}$$

and hence the calibration may be made as stated. There are other ways of varying the ratio of the opposing voltages which can also be made to give a calibrated scale of K. For instance, the voltages 23 and 24 impressed upon the bridges may be varied relative to each other by conventional means, in which case the two bridges may be opposed directly without the necessity for voltage divider 26.

It may be observed that my device may be used to advantage for measuring K direct, in addition to the above-described tolerance determination. We may start at point 27 of Fig. 1 and individually balance the load and deflection bridges of Fig. 4, say by energizing them one at a time and adjusting 19 and 20, with contact 26 set at any point but preferably somewhere near the expected value of K. Then if we increase the load to some other point 28 of Fig. 1 and rebalance meter 21 by moving contact 26, leaving adjustments 19 and 20 fixed, the final position of contact 26 enables us to read K off on the calibrated scale. Thus, my invention serves a double purpose in the testing of springs.

In order to make the same individual device accurately perform over a wide range of spring deflections and loadings, I provide a number of interchangeable sets of deflection springs 10 in Fig. 2 of differing stiffnesses so that I can vary the output of the deflection bridge of Fig. 4. It may be seen that, the stiffer the spring 10 is, the greater the relative output of the deflection bridge will be for a given deflection of spring 5. In this way I get a simple multiplying factor to apply to the calibrated K scale by proper choice of springs 10. I can also achieve my purpose by changing the degree of stiffness of elements 7 or 8 or both, as will readily be seen. Thus it may be seen that by providing a few extra parts I can supply a device which will perform accurately over a wide range of spring characteristics.

Figure 5:
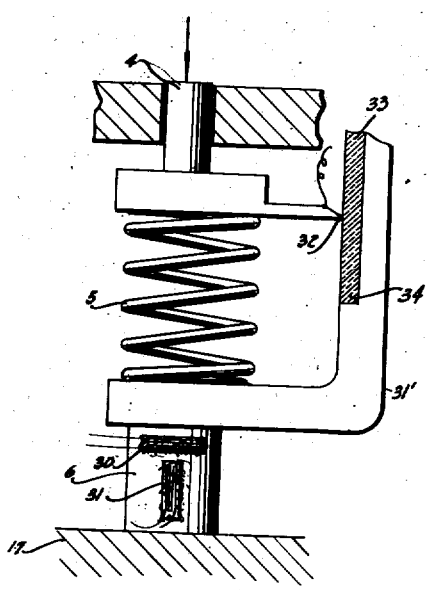
Fig. 5 is a modified tester employing a slide wire type of potentiometer.

The modification of Fig. 5 shows an arrangement combining a strain gage or other impedance-responsive load-weighing element with a simple slide wire type of potentiometer. Corresponding parts are numbered identically to those in Fig. 2. In this arrangement I show the spring load carried by a rigid dynamometer element which may be an elastic member acting in direct stress on which are mounted strain gages 30 and 31 responsive to the load thereon. A slide wire insulated from and carried by arm 31' projecting from block 6 is contacted by a sliding contact 32, dividing it into portions 33 and 34. Both slide wire and gages are in multiple if desired, as explained in connection with Fig. 2, in order to satisfy circuit requirements and to properly cancel out effects of eccentricity or non-uniform loading of spring 5.

Fig. 6 shows a circuit suited to the arrangement illustrated in Fig. 5. Corresponding parts are numbered identically to those in Fig. 4. The circuit arrangement and operation are quite analogous to those of Fig. 4 and do not require detailed explanation. In Fig. 6 I have shown as means for varying the ratio of the opposed voltages rheostats 35 and 37 with contactors 36 and 38. These may be calibrated in terms of K, the spring stiffness, as explained above in the case of the system disclosed in Fig. 4. As a further variation, I have shown a simple indicator 39, which can be a galvanometer of suitable sensitivity or other indicator, recording or controlling device. Referring to both Figs. 5 and 6, it will be seen that the mechanical device and the circuit are simpler than those of Figs. 2 and 4.

Fig. 7 shows for purposes of illustration the application of electromagnetic gaging principles as a substitute for member 31. Head 6 is supported on member 40 which is made of a magnetically sensitive elastic material such as iron, nickel, or Hypernic around which is wound a coil 41. An identical or similar dummy member 42 with coil 43 serves as temperature compensator. Coils 41 and 43 may be in multiple and the load bridge of Fig. 6 would have coils 41 and 43 as adjacent arms. The impedance of coil 41 will be sensitive to the load on spring 5.

Figure 8:
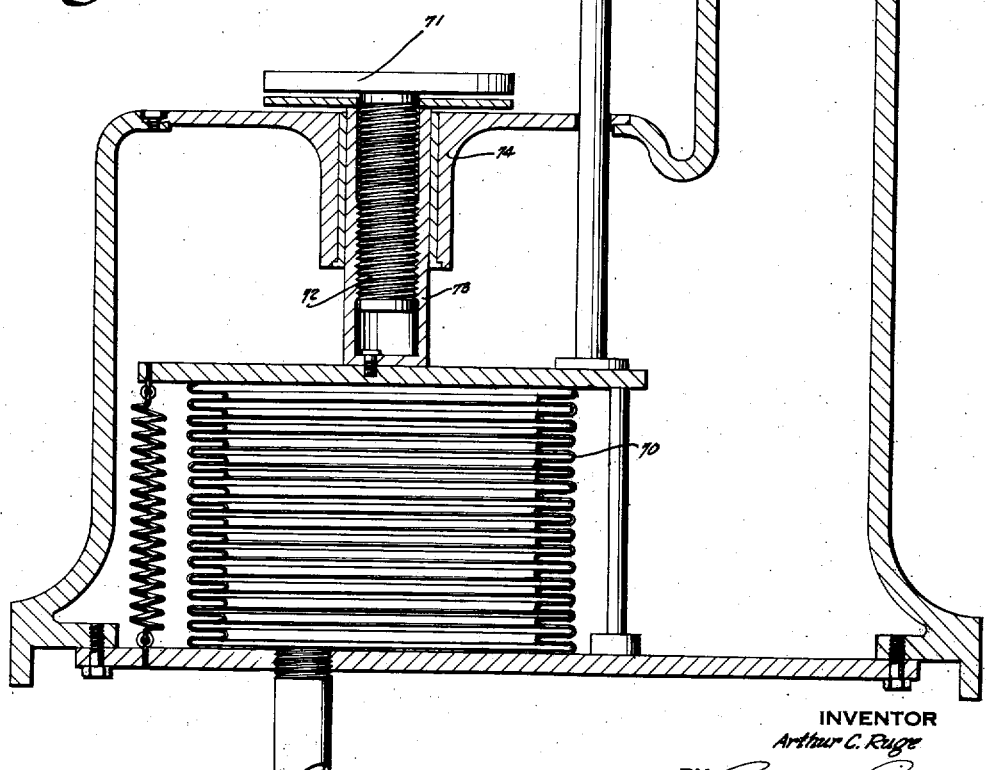
Fig. 8 is a vertical section of a machine embodying my invention.

In the modification shown in Fig. 8, I have provided a fluid actuated "sylphon" bellows 70 as the loading means for moving a specimen engaging platform 71. This platform may be vertically adjusted by a screw 72 to accommodate springs of different heights. The screw and its surrounding casing 73 is suitably guided in a frame 74 which has a head piece 75. To measure the load actually transmitted through a spring under test, I provide an upper platform 76 which has a plurality of radially extending flexible arms 77, each supported at their outer ends by knife edges 78 and links 79. The arms are preferably three in number, the same as shown for the Fig. 3 arrangement. Springs 80 hold the knife edges upwardly in seating contact with the links, these springs having no other function. Strain gages are mounted on these flexible arms in the same manner as disclosed for the arms 7 of Fig. 2. To measure deflection a plurality of flexible arms 81, preferably three, radiate out from the head structure 76 and are connected at their outer ends by springs 82 to a vertically movable rod 83. This rod is connected to the upper movable end of the "sylphon" bellows 70 so as to have identically the same movement as head 71 which will represent the deflection of the spring, except for one correction. For instance, the loading crosshead 71 has the combined movement of the spring deflection plus the upward movement of the upper crosshead 76. The movement of upper crosshead 76 must be subtracted from the movement of rod 83 which is accomplished by reason of flexible arms 81 being carried by the upper crosshead 76. Accordingly, the arms 81 will flex only in proportion to the actual deflection of the spring under test as modified by the degree of flexibility of control spring 82. This control spring is selected as to its flexibility in accordance with the relation desired between load and deflection of the spring under test. Strain gages 77' and 81' are secured to the flexible members 77 and 81 in the same manner as the gages are applied to flexible arms 8 of Fig. 2. The circuits previously described are then employed and their mode of operation is the same.

Figure 9:
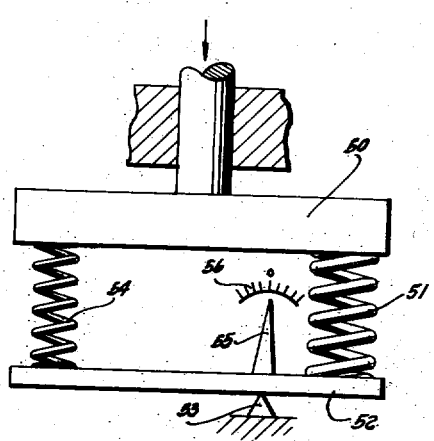
Fig. 9 is a diagrammatic outline of a spring testing machine employing a mechanically actuated indicator operated in accordance with the principles of my invention.

In the modification shown in Fig. 9, a spring loading platen diagrammatically indicated at 50 is moved downwardly by any suitable mechanism and is adapted to compress a precalibrated standard spring 51 of predetermined load versus deflection characteristics. This spring is seated upon a lever 52 pivoted on a suitable knife edge fulcrum 53 while a test spring 54 is interposed between the platen and lever 52. The knife edge 53 can be shifted along the lever 52 to various positions calibrated in terms of the spring constant K which is the desired stiffness of the test spring. A pointer 55 secured to the lever 52 is adapted to indicate on a stationary scale 56 the movement of lever 52. In operation, fulcrum 53 will be placed in any predetermined position along lever 52 whereupon platen 50 will simultaneously compress standard spring 51 and test spring 54. If the load-deflection characteristics of spring 54 follow a desired relation, then lever 52 will remain in a horizontal position and pointer 55 will remain at its zero position. However, any variation in the load-deflection characteristics of the test spring from a predetermined value will cause lever 52 and pointer 55 to swing in one direction or the other from their zero position. Certain tolerance limits may be set for the springs under test, these limits being indicated by the graduation marks on scale 56. While this arrangement requires a carefully precalibrated standard spring, yet the structure is mechanically simple and its accuracy depends solely upon the care and precision with which it is made. This combination embodies certain fundamental principles in common with my preferred form in that the loading platen 50 constitutes a means for applying load to a spring under test. The spring 51 and lever 52 constitute means for determining variations in the test spring from a predetermined relation between load and deflection and the indicator 55 is controlled by this latter means to indicate the extent of variation. Similar broad elements are also present in the preferred form.

From the above disclosures it will be seen that I have provided improved apparatus for spring testing which is simple, accurate, and fast in operation, as well as being practical and economical to build.

It will of course be understood that various changes in details of construction and arrangement of parts may be made by those skilled in the art without departing from the spirit of the invention as set forth in the appended claims.

I claim:

1. Apparatus for testing the relation between deflection of a spring and the load required to produce the deflection comprising, in combination, means for loading a spring under test, two deformable means adapted to be deformed uninterruptedly upon continuous application of load to the spring under test throughout its full load range, one of said deformable means being deformably responsive to deflection of the spring under test, the other of said deformable means being deformably responsive to the load applied to the spring under test, means operatively connecting both of said deformable means to the spring so as to transmit load and deflection characteristics thereof continuously to them throughout the full load range of the spring regardless of whether or not said characteristics vary from a predetermined relation, and means controlled by both of said deformable means so as to provide a single coordinated indication continuously over the entire range of the spring upon variations of a predetermined relation between load and deflection thereof.

2. Apparatus for testing the relation between deflection of a spring and the load required to produce the deflection comprising, in combination, means for loading a spring under test, means including electrical impedance strain responsive means continuously responsive to the load throughout the full load range of the spring, means including electrical impedance strain responsive means continuously responsive to the deflection of the spring as a result of the applied load at any given instant anywhere in the full load range of the spring, electrically controlled indicating means, and means normally continuously connected to both of said continuously responsive impedance means and to said indicating means so as to actuate the latter when the relation between load and deflection of the spring varies from a predetermined value over the entire range of the spring.

3. The combination set forth in claim 2 further characterized by the provision of means whereby the desired predetermined relation between deflection and load may be varied.

4. The combination set forth in claim 2 further characterized in that the load responsive means includes a yieldable member which yields in response to the applied load.

5. The combination set forth in claim 2 further characterized in that the load responsive means includes a continuously yieldable member which yields continuously in response to the applied load and the deflection responsive means also includes a yieldable member but which yields to a different extent than the load yielding element, and the indicating means is controlled in accordance with the relative yielding of both said yieldable means.

6. The combination set forth in claim 2 further characterized in that the indicating means comprises a pair of bridges, the impedance devices of the load responsive means being located in one of said bridges and the impedance device of the deflection responsive means being in the other bridge, and said bridges being balanced against each other whereby the balance is maintained so long as the respective impedance devices are varied in a desired proportion between deflection and load.

7. Apparatus for testing the relation between deflection and load of a spring comprising, in combination, means for loading a spring under test including a movable load applying element which moves in a predetermined proportion to the deflection of the spring during loading thereof, a flexible load responsive member, a flexible deflection measuring member connected by a spring to said loading means whereby movement of the latter in response to deflection of the spring under test causes the deflection measuring member to flex, electrical impedance strain gages connected to each of the flexible members, and bridges balanced against each other and respectively containing said strain gages whereby a net unbalance between the bridges occurs when the deflection and loading of a spring under test varies from a predetermined relation.

8. The combination set forth in claim 7 further characterized by the provision of means whereby the bridges may be adjusted to establish any desired relationship between the loading and deflection of a spring under test.

ARTHUR C. RUGE.

REFERENCES CITED

The following references are of record in the file of this patent:

UNITED STATES PATENTS

| Number | Name | Date |
| --- | --- | --- |
| 878,346 | Clark | Feb. 4, 1908 |
| 1,120,838 | Miller | Dec. 15, 1914 |
| 1,681,047 | Porter | Aug. 14, 1928 |
| 1,874,780 | McGukin | Aug. 30, 1932 |
| 2,164,453 | Gaskins | July 4, 1939 |
| 2,170,197 | Gumprich | Aug. 22, 1939 |
| 2,271,739 | Link | Feb. 3, 1942 |
| 2,316,975 | Ruge | Apr. 20, 1943 |
| 2,322,319 | Ruge | June 22, 1943 |
| 2,356,763 | Keinath | Aug. 29, 1944 |
| 2,360,886 | Osterberg | Oct. 24, 1944 |
| 2,458,704 | Hem | Jan. 11, 1949 |

Certificate of Correction

Patent No. 2,568,596 September 18, 1951

ARTHUR C. RUGE

It is hereby certified that error appears in the printed specification of the above numbered patent requiring correction as follows:

Column 5, line 48, for "$C \times P' - d'$" read $C \times P' = d'$; column 8, line 73, strike out "continuously"; column 9, line 1, before "yieldable" insert *continuously*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*